(12) United States Patent
Zien et al.

(10) Patent No.: US 7,438,300 B1
(45) Date of Patent: Oct. 21, 2008

(54) HAND TRUCK WITH PIVOTAL RETAINER

(75) Inventors: Jerry J. Zien, Prior Lake, MN (US);
Nathan J. Friberg, Bloomington, MN (US)

(73) Assignee: Miller Manufacturing Company, Inc., Eagan, MN (US)

( * ) Notice: Subject to any disclaimer, the term of this patent is extended or adjusted under 35 U.S.C. 154(b) by 215 days.

(21) Appl. No.: 11/408,597

(22) Filed: Apr. 21, 2006

(51) Int. Cl.
*B62B 1/26* (2006.01)

(52) U.S. Cl. ............... 280/79.5; 280/652; 280/654; 280/659; 280/47.26

(58) Field of Classification Search ........... 280/79.11, 280/2, 79.5, 79.6, 79.7, 651, 652, 654, 659, 280/47.131, 47.17, 47.18, 47.26, 47.27, 47.28, 280/47.29; 403/100, 101, 102
See application file for complete search history.

(56) References Cited

U.S. PATENT DOCUMENTS

| | | | | |
|---|---|---|---|---|
| 1,718,962 A * | 7/1929 | Kimball | ...................... | 280/655 |
| 1,749,706 A * | 3/1930 | Kingston | .................... | 182/225 |
| 3,754,771 A * | 8/1973 | Shagoury | ................... | 280/654 |
| 3,826,511 A * | 7/1974 | Frank | ......................... | 280/653 |
| 4,703,944 A * | 11/1987 | Higson | ......................... | 280/30 |
| 4,765,645 A * | 8/1988 | Shamie | ....................... | 280/644 |
| 4,826,187 A * | 5/1989 | Abbott et al. | ................. | 280/35 |
| 5,380,033 A * | 1/1995 | Harling | ....................... | 280/654 |
| 6,135,466 A * | 10/2000 | Irwin | ...................... | 280/47.28 |
| 6,805,409 B2 * | 10/2004 | Parker | ........................ | 297/377 |
| 6,837,502 B1 * | 1/2005 | Lee | ............................ | 280/79.5 |
| 2004/0245735 A1 * | 12/2004 | Pins | ........................... | 280/79.5 |
| 2004/0256817 A1 * | 12/2004 | Sandoval | ................. | 280/47.26 |

OTHER PUBLICATIONS

4 Photographs of 4 Different Muck Carts, undated but admitted prior art.

* cited by examiner

*Primary Examiner*—Christopher Ellis
*Assistant Examiner*—John D Walters
(74) *Attorney, Agent, or Firm*—James W. Miller

(57) ABSTRACT

A hand truck for carrying and transporting an object comprises a frame having a base and a back arranged in a generally L-shaped configuration. The frame is supported by at least a pair of wheels for rolling over the ground. An object may be placed on the base for using the hand truck to move the object. A retainer has a loading position in which the retainer is sufficiently clear of the base to allow the object to be slid onto the base. After the object is slid onto the base, the retainer may be raised to a transport position in which the retainer at least partially encircles the object to hold the retainer on the base. The retainer may be releasably latched in the transport position.

13 Claims, 5 Drawing Sheets

US 7,438,300 B1

HAND TRUCK WITH PIVOTAL RETAINER

TECHNICAL FIELD

This invention relates to a hand truck having wheels for allowing a user to manually transport an object over a surface, such as the ground, by placing the object on the hand truck and by then rolling the hand truck over the surface.

BACKGROUND OF THE INVENTION

Farmers and ranchers commonly use large 40-70 quart tubs, called muck tubs, to carry water, animal feed/waste, etc. Such muck tubs can weigh 100 lbs or more when filled. As a result, filled muck tubs are very difficult or impossible to carry by hand.

A form of hand truck known as a muck cart is used to transport muck tubs over various terrains. Like most hand trucks, such a cart includes a base on which the tub sits and a back that extends upwardly from the base. A pair of wheels is provided on the cart to allow the cart to roll over the ground. A handle is provided on the back to allow a user to push or pull the cart while the cart carries the tub over the ground. If need be, the cart can be tipped to the rear about the rotational axis of the wheels to elevate the front of the base further off the ground during transport of the tub.

To keep the tub from falling off or tipping, most carts have some-type of tub retainer. The tub retainer is fixed in place on the cart slightly above the base of the cart. The retainer is shaped to at least partially surround and encircle the tub at a location about ⅓ to ⅔ up the height of the tub.

The tub retainer is effective in keeping the tub from falling off or tipping on the cart. However, the tub retainer forms a fixed barrier in terms of removing and emptying the tub. The tub has to be lifted up and over and dropped down through the retainer to place the tub on the cart or has to be pulled up and over the retainer to remove the tub from the cart. While it may not be difficult to do this with an empty tub, it is very difficult to remove or install a tub that is filled due to the heavy weight of a filled tub. It takes considerable strength and effort to lift a 100 pound tub up and over the tub retainer.

SUMMARY OF THE INVENTION

One aspect of this invention relates to a hand truck for transporting an object by rolling the object over a surface. The hand truck comprises a frame having a generally horizontal base and a generally vertical back. The back includes a handle. At least two wheels are carried on the frame to permit the frame to roll over the surface when a user grips the handle and pulls or pushes on the handle to manually propel the frame over the surface. A retainer is movably carried on the frame. The retainer moves relative to the frame between a transport position in which the retainer obstructs the base sufficiently to pre-vent the object from sliding substantially horizontally onto or off of the base and a loading position in which the retainer is sufficiently clear of the base to permit the object to be loaded or unloaded from the base by sliding the object substantially horizontally onto or off of the base.

Another aspect of this invention relates to a hand truck for transporting an object by rolling the object over a surface. The hand truck comprises a generally L-shaped frame have a base and a back. The frame is supported for rolling over the ground. A U-shaped retainer is provided having a pair of laterally spaced arms connected together by a front crossmember. A pair of pivots pivotally mounting the arms of the retainer to opposed sides of the back of the frame at a location above the base of the frame. The arms of the retainer become sprung apart when mounted on the pivots to bias the arms towards one another.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
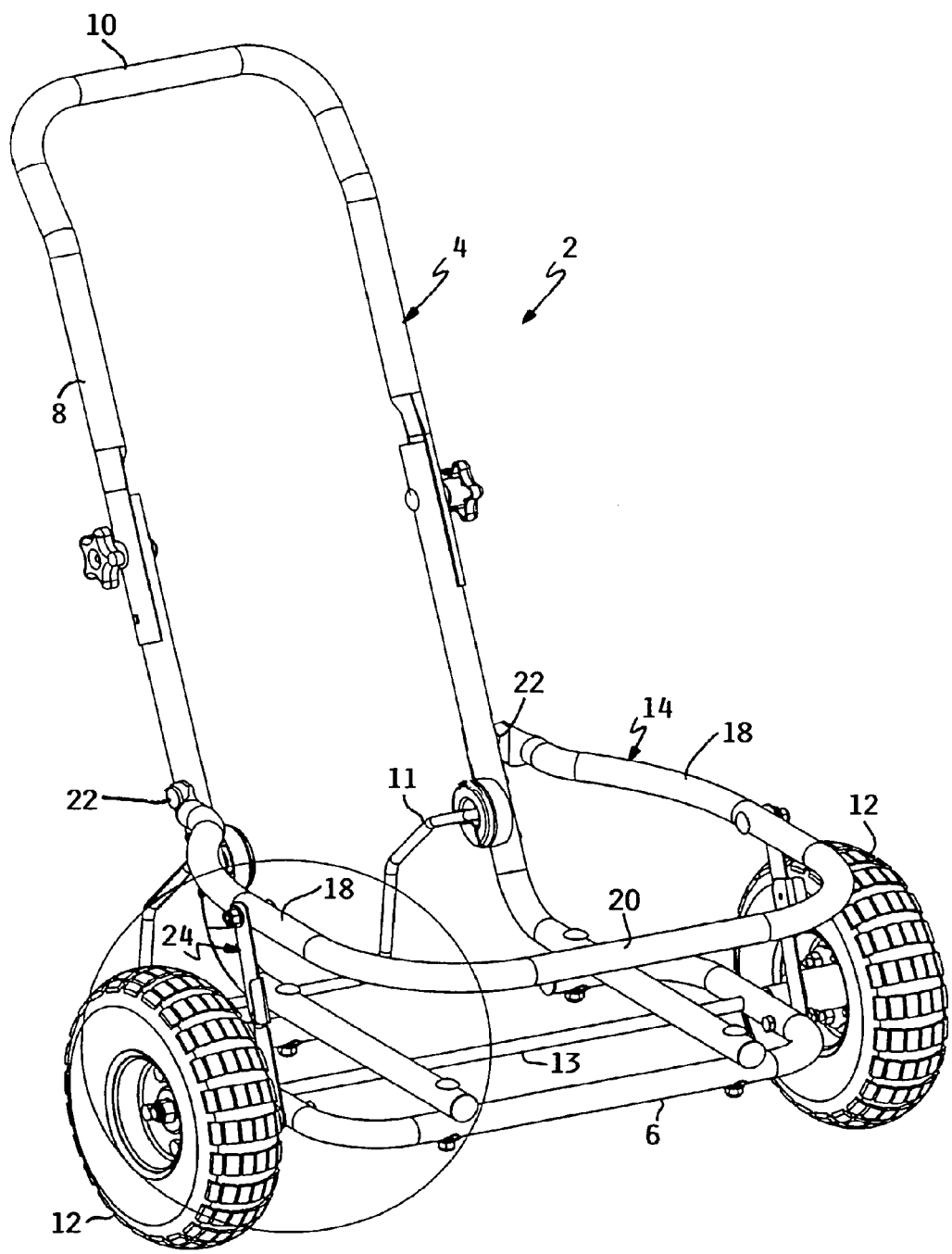
FIG. 1 is a perspective view of a hand truck according to this invention, particularly illustrating an empty hand truck with the pivotal retainer on the hand truck disposed in a raised and latched transport position forming an auxiliary support on the hand truck.

A hand truck according to this invention is illustrated in the drawings as 2. Hand truck 2 comprises a frame 4 that includes a base 6 and a back 8 that projects upwardly from the rear of base 6. Overall, base 6 and back 8 of hand truck 2 generally form an L-shape with back 8 being longer than base 6. The top of back 8 has a handle 10 that may be gripped by a user to manipulate hand truck 2. The bottom of back 8 includes a manually deployable kickstand 11.

A pair of ground engaging wheels 12 support frame 4 of hand truck 2 for rolling over a surface, such as the ground, a floor, a road, etc. Wheels 12 are carried on opposite ends of an axle 13 that extends transversely across and slightly beyond the width of base 6 of frame 4. Wheels 12 are preferably positioned fore and aft about midway along the length of base 6 between the front and rear of base 6. The fore and aft position of wheels 12 could be shifted forwardly or rearwardly along base 6 from that shown in the drawings and more than one pair of wheels 12 could be used if so desired.

Frame 4 of hand truck 2 including base 6 and back 8 is made from a plurality of steel tubes or the like that are bolted or otherwise fixed together. This is not the only construction that is possible for hand truck 2. Base 6 and/or back 8 of frame 4 could instead be made from solid pieces or sheets of material rather than having an open tubular construction. Thus, this invention encompasses hand trucks other than the one shown herein.

Hand truck 2 of this invention includes a movable retainer illustrated generally as 14. Retainer 14 is generally U-shaped to at least partially surround and encircle an object, such as a muck tub 16, placed on base 6 of hand truck 2. Retainer 14 comprises a pair of spaced arms 18 connected at their front ends by a front crossmember 20. The rear ends of arms 18 are pivotally mounted by a pair of pivots 22 to opposite sides of back 8 of frame 4. Pivots 22 are located fairly low on back 8 of frame 4 so that retainer 14 when horizontal will be positioned about a quarter or a third of the way up the height of a typical tub 16. See FIG. 2.

Figure 2:
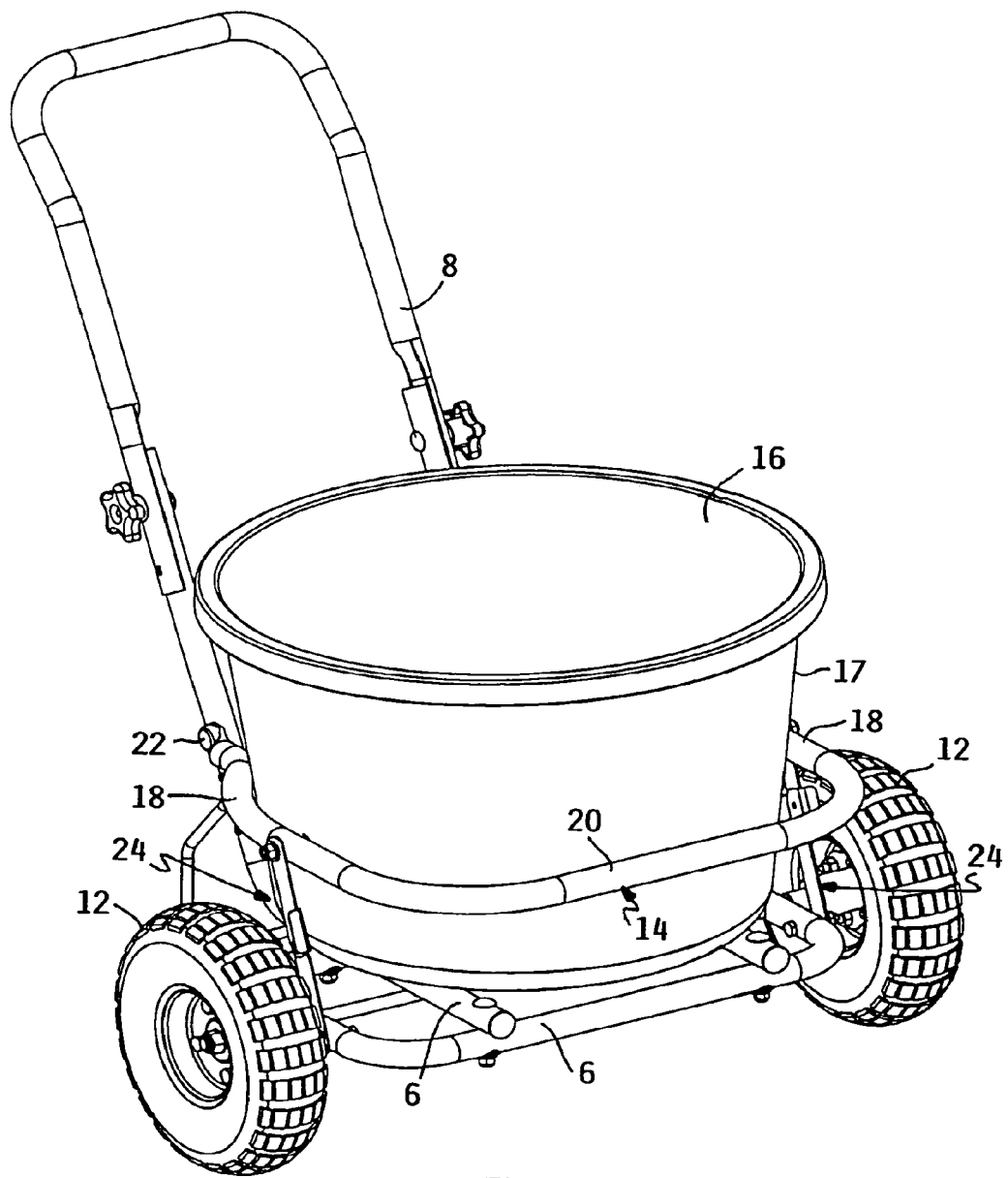
FIG. 2 is a perspective view similar to FIG. 1, illustrating a loaded hand truck that carries a tub on the base of the hand truck with the tub being at least partially encircled and retained by the pivotal retainer which is illustrated in its latched transport position.
Figure 3:
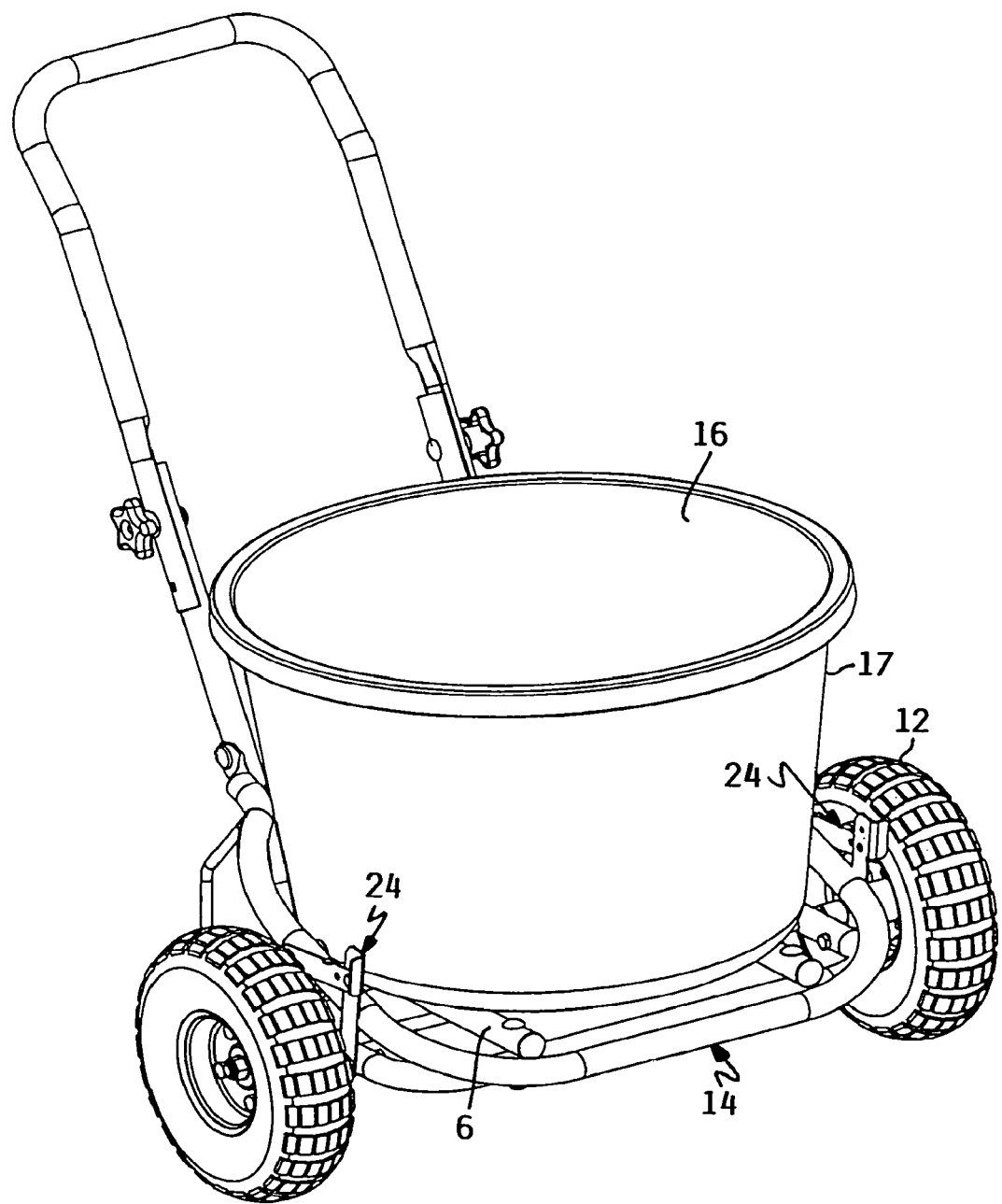
FIG. 3 is a perspective view similar to FIG. 2, illustrating the pivotal retainer in a lowered and unlatched loading position to permit the tub to be substantially horizontally slid onto and off of the base of the hand truck without having to lift the tub up and over the retainer.

The purpose of pivotally mounting retainer 14 on frame 4 of hand truck 2 is to permit retainer 14 to be moved from a raised transport position, as shown in FIG. 2, to a lowered loading position, as shown in FIG. 3. In the transport position of FIG. 2, retainer 14 is substantially horizontal and at least partially encircles the tub to retain the tub on base 6. But, when it comes time to load or unload a filled tub from hand truck 2, retainer 14 can be lowered into its loading position in FIG. 3 in which retainer 14 clears the bottom of the tub. Thus, a filled tub can be more easily slid onto or off of base 6 when retainer 14 is in its lowered loading position.

The pivotal mounting of retainer 14 on frame 4 and its orientation when in its lowered loading position means that a filled tub no longer has to be lifted up and over retainer 14 when retainer 14 is in the transport position. This allows the user to tip or tilt the hand truck to get the front of base 6 adjacent a filled tub and then merely pull the tub up onto base 6 to slide the tub onto base 6 or to pull the tub off base 6.

Figure 4:
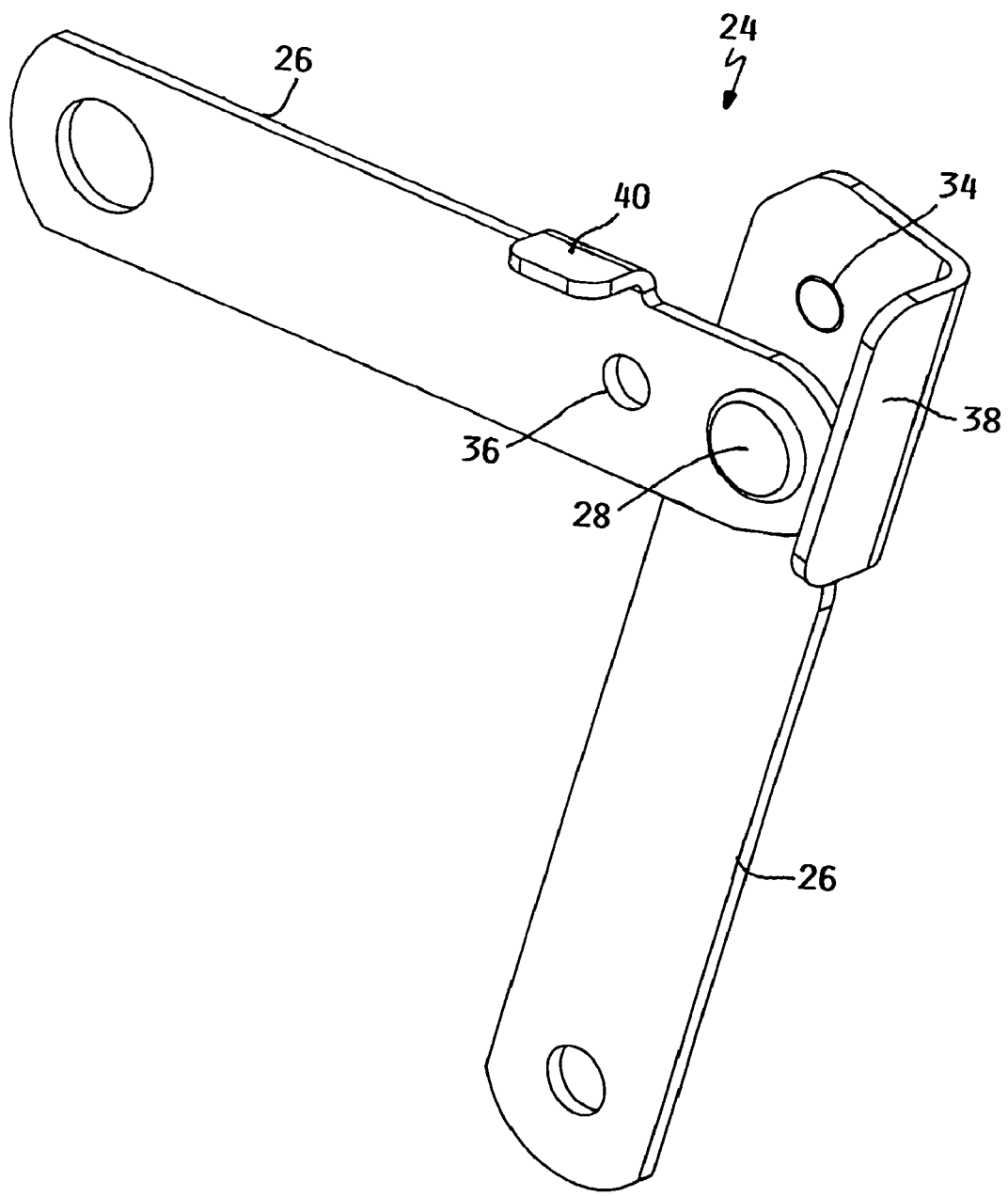
FIG. 4 is a perspective view of the latch that holds the retainer in the transport position, particularly illustrating the latch in a bent unlatched position where the latch is ineffective to hold the retainer in the transport position.
Figure 5:
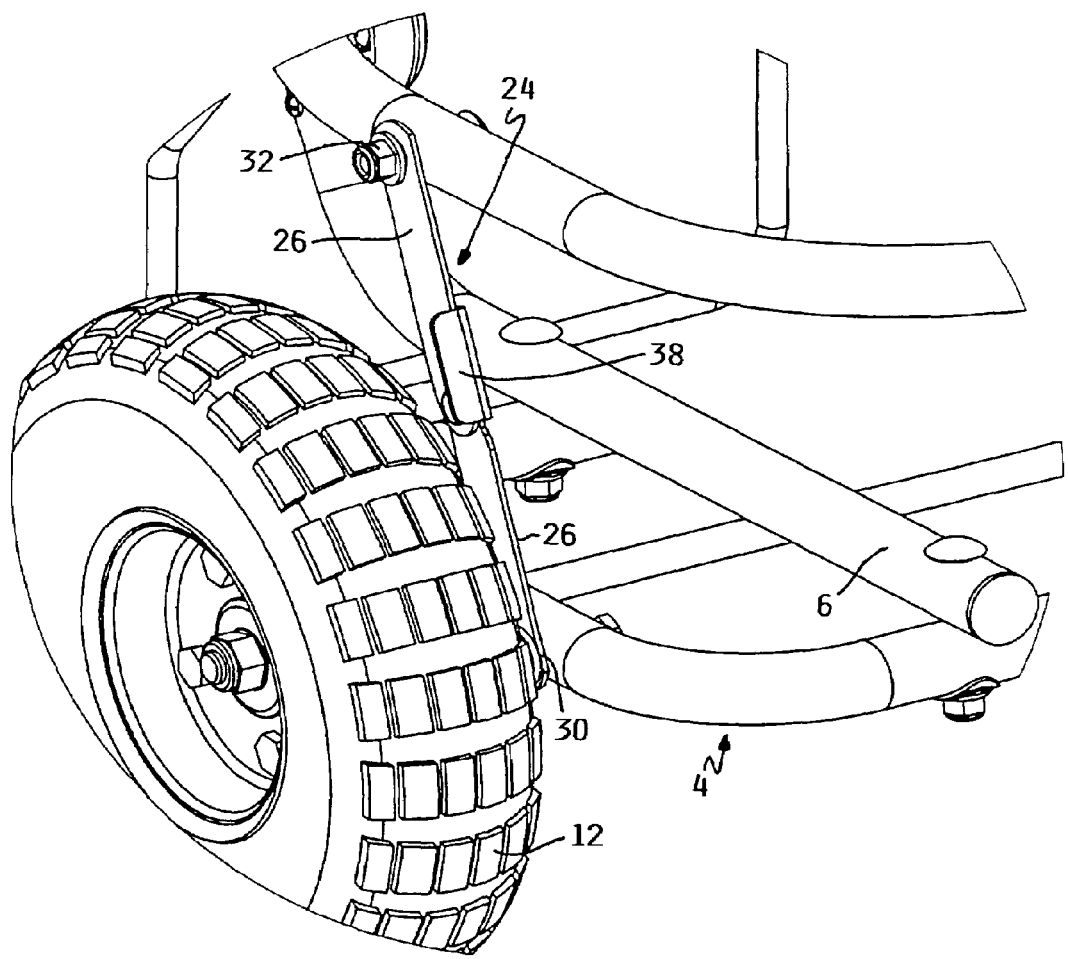
FIG. 5 is an enlarged perspective view of the circled portion of FIG. 1, particularly illustrating the latch in a straight line latched position where the latch forms a locking brace that is effective to hold the retainer in the transport position.

A simple latch 24 is provided for holding retainer 14 in its raised transport position. Latch 24 comprises a pair of levers 26. Referring to FIG. 4, levers 26 are pivoted to one another at 28. The opposite ends of the levers 26 are then pivoted to frame 4 of hand truck 2 at 30 and to retainer 14 at 32, respectively, as shown in FIG. 5. Referring again to FIG. 4, one lever 26 carries a raised projection 34 that fits into a hole or recess 36 on the other lever 26. Together, projection 34 and hole or recess 36 form a detent.

Referring to FIG. 5, the pair of levers 26 can be aligned end-to-end with one another to define a straight line, latched position. In this latched position, levers 26 form a locking brace that prevents retainer 14 from pivoting downwardly relative to frame 4 to thereby hold retainer 14 in its raised transport position. In this latched position as shown in FIG. 5, the detent between levers 26 is engaged, namely projection 34 on the one lever is received in hole or recess 36 on the other lever.

The user can manually unlatch levers 26 by gripping a tab 38 on one lever 26, tab 38 normally engaging against a stop 40 on the other lever 26. In any event, if the user pulls forwardly on tab 38, this overcomes the holding force provided by the detent and allows the pair of levers 26 to fold into a bent unlatched position relative to one another as shown in FIGS. 3 and 4. In fact, if the user keeps holding onto tab 38, tab 38 forms a convenient handle to allow the user to lower retainer 14 into its unlatched position. In this unlatched position, levers 26 no longer brace retainer 14 relative to frame 4 and thus retainer 14 can pivot downwardly into its loading position. A pair of these lever type latches 24 are preferably used—one latch 24 on each side of retainer 14 between retainer 14 and each of the lateral sides of frame 4 of hand truck 2.

Preferably, retainer 14 is shaped so that when arms 18 are installed onto pivots 22, arms 18 become slightly sprung apart relative to one another, thereby creating an inward biasing force on arms 18. As retainer 14 lifts upwardly from its loading position to its transport position, retainer 14 can engage the outwardly tapering sidewalls 17 of tub 16 if tub 16 is large enough. In this circumstance, retainer 14 will exert an inward gripping or pinching force on sidewalls 17 of tub 16 when retainer 14 is in the trans-port position. This pinching force further helps secure retainer 14 on base 6 of hand truck 2.

Various modifications of this invention will be apparent to those skilled in the art. For example, a clearance could, in fact, be present between arms 18 and sidewalls 17 of tub 16 when retainer 14 is in the transport position. In this latter case, there would be no gripping or pinching force exerted on tub 16 by retainer 14.

In addition, various objects could be carried on base 6 of hand truck 2 other than tub 16 shown herein as long as such objects fit within retainer 14. If an object is too large to fit within retainer 14, then retainer 14 could still be disposed in the transport position. Such a larger object, such as a bag of feed or a bale of hay, could be laid on top of retainer 14. Since the top of retainer 14 is level with or above the tops of wheels 12, such a larger object could even extend out over wheels 12. Consequently, retainer 14 also serves as an auxiliary, selectively usable load carrying support on hand truck 2.

Thus, the scope of this invention is to be limited only by the appended claims.

We claim:

1. A hand truck for transporting an object by rolling the object over a surface, which comprises:
    (a) a frame having a generally horizontal base and a generally vertical back, the back including a handle;
    (b) at least two wheels carried on the frame to permit the frame to roll over the surface when a user grips the handle and pulls or pushes on the handle to manually propel the frame over the surface;
    (c) a retainer movably carried on the frame, wherein the retainer moves relative to the frame between a transport position in which the retainer obstructs the base sufficiently to prevent the object from sliding substantially horizontally onto or off of the base and a loading position in which the retainer is sufficiently clear of the base to permit the object to be loaded or unloaded from the base by sliding the object substantially horizontally onto or off of the base, wherein the transport and loading positions are vertically displaced or offset from one another relative to the base of the frame.

2. The hand truck of claim 1, further including at least one latch for releasably holding the retainer in the transport position.

3. The hand truck of claim 1, wherein the retainer pivots on the frame in moving between the transport and loading positions.

4. The hand truck of claim 1, wherein the retainer is shaped to at least partially encircle the object.

5. The hand truck of claim 1, wherein the retainer is substantially U-shaped comprising a pair of laterally spaced arms connected together by a front crossmember.

6. The hand truck of claim 1, wherein the object comprises a muck tub having sidewalls that slope outwardly as they extend upwardly, wherein the retainer is U-shaped to exert a gripping or pinching force on the sidewalls of the muck tub when the muck tub is on the base and the retainer is disposed in the transport position if the muck tub is large enough so that the U-shaped retainer engages with the sidewalls of the muck tub.

7. The hand truck of claim 1, wherein the transport position of the retainer is raised relative to the base and the loading position of the retainer is lowered relative to the base.

8. The hand truck of claim 7, wherein the retainer pivots on the frame in moving between the transport and loading positions.

9. A hand truck for transporting an object by rolling the object over a surface, which comprises:
   (a) a frame having a generally horizontal base and a generally vertical back, the back including a handle;
   (b) at least two wheels carried on the frame to permit the frame to roll over the surface when a user grips the handle and pulls or pushes on the handle to manually propel the frame over the surface;
   (c) a retainer movably carried on the frame, wherein the retainer moves relative to the frame between a transport position in which the retainer obstructs the base sufficiently to prevent the object from sliding substantially horizontally onto or off of the base and a loading position in which the retainer is sufficiently clear of the base to permit the object to be loaded or unloaded from the base by sliding the object substantially horizontally onto or off of the base; and
   (d) at least one latch for releasably holding the retainer in the transport position, wherein the latch comprises a pair of pivotal levers that form a locking brace between the retainer and the frame with the locking brace being so oriented that the locking brace prevents the retainer from moving relative to the frame when the levers are aligned relative to one another in a straight line latched position.

10. The hand truck of claim 9, further including a detent between the levers with the detent being engaged when the levers are in the latched position, the detent providing a holding force that maintains the levers in the latched position.

11. The hand truck of claim 9, further including a tab on at least one lever in the pair of levers to allow a user to grab the tab to manually move the levers out of their latched position into a bent unlatched position relative to one another in which the locking brace is no longer formed by the levers to permit the retainer to move relative to the frame.

12. The hand truck of claim 9, wherein the retainer has left and right sides above left and right sides of the base, and wherein a pair of latches are provided with one latch being provided between the right side of the retainer and the right side of the base and the other latch being provided between the left side of the retainer and the left side of the base.

13. A hand truck for transporting an object by rolling the object over a surface, which comprises:
   (a) a frame having a generally horizontal base and a generally vertical back, the back including a handle;
   (b) at least two wheels carried on the frame to permit the frame to roll over the surface when a user grips the handle and pulls or pushes on the handle to manually propel the frame over the surface;
   (c) a retainer movably carried on the frame, wherein the retainer moves relative to the frame between a transport position in which the retainer obstructs the base sufficiently to prevent the object from sliding substantially horizontally onto or off of the base and a loading position in which the retainer is sufficiently clear of the base to permit the object to be loaded or unloaded from the base by sliding the object substantially horizontally onto or off of the base; and
   (d) wherein the retainer is substantially U-shaped comprising a pair of laterally spaced arms connected together by a front crossmember, wherein the arms of the retainer have rear ends that are pivotally connected to opposite sides of the back of the frame of the hand truck by a pair of pivots.

\* \* \* \* \*